Feb. 3, 1931.                W. J. SMITH                1,790,773
                              SHOCK ABSORBER
                            Filed Sept. 12, 1929
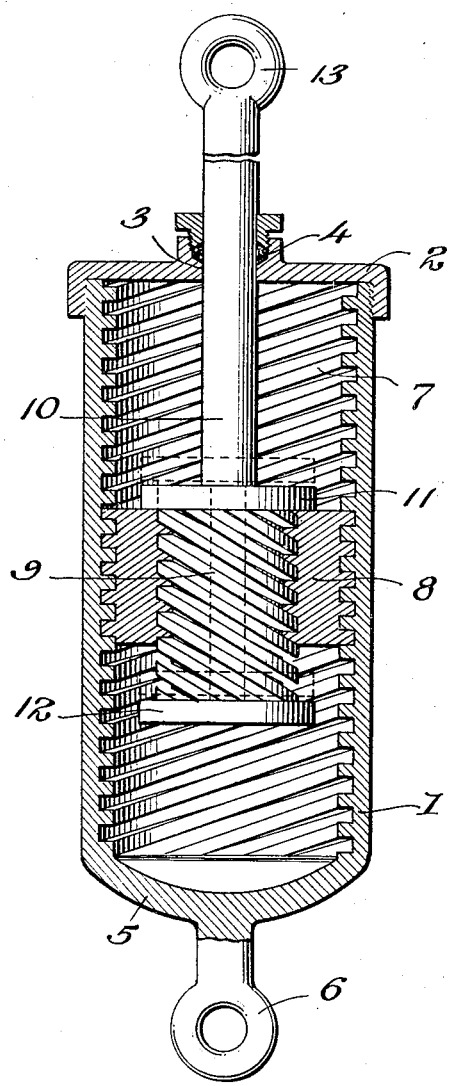
Inventor
William J. Smith,
By David H. Mead
        Attorney Patented Feb. 3, 1931

1,790,773

UNITED STATES PATENT OFFICE

WILLIAM J. SMITH, OF PHILADELPHIA, PENNSYLVANIA, ASSIGNOR TO CHARLES O. HADLY, OF PHILADELPHIA, PENNSYLVANIA

SHOCK ABSORBER

Application filed September 12, 1929. Serial No. 392,133.

This invention relates to shock absorbers intended primarily for use on motor vehicles, and which are available with slight modification for other similar purposes.

The principal object of the invention is to provide a shock absorber in which screw threaded interengaging members shall be so combined as to govern and gradually check, by reason of the friction between contacting parts, the movements of a spring-supported vehicle body in a manner to prevent sudden movements, or shocks to the body when the vehicle of which it forms a part moves over a rough road, over obstructions, depressions, etc., and the supporting springs are suddenly compressed or expanded. Another object is to provide a shock absorber of the general character mentioned in which the parts will be certain of functioning at the inception of any movement of a vehicle body induced by the actions of the supporting springs as the vehicle passes over a rough road, obstruction or depression, and which will gradually check such movement and also the counter movement, as under the action of the springs the body is returned to its normal position, and prevent shock or jar to the body.

In the use of interengaging screw threaded parts, as the active elements, in the construction of shock absorbers, several objectionable conditions are encountered, and unless these are modified or overcome the devices in which they are incorporated are impracticable and fail to perform their designed functions. For instance, if the pitch of the engaging screw threads of the coacting parts is too high, the independent movements of the parts is too rapid, when conditions arise to contract or expand the vehicle-supporting springs, and consequently there is little or no governing of the objectionable movement of the body of the vehicle carried on the springs. On the other hand, if the pitch of the threads of the parts is too low and a sudden pressure, in the nature of a blow, is imparted to them, the inclination of the meeting faces of the screw threads is too small to insure their moving over each other under the impact. Consequently, no action of the parts of the shock absorber tending to check the sudden movement of the body, or to absorb shock, takes place.

In the shock absorber which I have devised provision is made for receiving initially the force of a compressing or expanding movement of the supporting springs of a vehicle upon comparatively high pitched contacting screw threads of relatively movable parts of the device, thus insuring operative movement of the parts, whether the force exerted upon them be great or small. If a small force is exerted, the frictional contact between the parts of the shock absorber having the highly pitched threads will serve to check the movement of the vehicle body, and to absorb any attendant shock. Should the force be of any considerable amount, too great to be checked by the retarding frictional contact of the high pitched threads, similarly contacting comparatively low pitched threads on moving parts of the device are automatically brought into operation, and as a consequence the spring movement is gradually checked and shock or jar to the body of the vehicle prevented.

The generic ideas involved in my device may be carried out by the use of various constructions, and a simple form is illustrated in the accompanying drawing.

The drawing is a central vertical sectional view of one form of the shock absorber, the relative normal positions of the parts being shown by dotted lines.

In this drawing 1 represents the body of the device, which is herein shown as cylindrical and provided with a screw cover 2 having in its center an opening 3 and provided with a stuffing box 4 surrounding the opening. The lower closed end 5 of the cylinder has extending from it a projection or arm 6 to form means for securing it in position for use.

The entire inner face of the body 1 is provided with screw threads 7, the pitch of which is determined by the use for which the shock absorber of which it forms a part. For general use, such as upon ordinary motor cars, the pitch may advantageously be 20°, more or less.

Located in the body 1 and screw threaded both exteriorly and interiorly is a ring or sleeve 8. The screw threads on the exterior of this collar are of a pitch to engage and coact with those on the inner face of the body 1, while those on the interior are of higher pitch. Arranged in the collar 8 and corresponding in diameter to the interior of the collar is a cylinder 9 provided on its outer face with screw threads which correspond with those on the inner face of the ring or collar 8, and which engage the latter. Extending through the cylinder 9, and projecting at its upper end through the screw cover 2 is a stem 10. The stem 10 is attached to the cylinder in a manner to allow rotation of the cylinder independently of the stem, and to prevent independent longitudinal movements of the parts. Secured to the upper end of the cylinder 9 is a disk 11 of a diameter greater than that of the cylinder the outer edge of which overlaps the ring or sleeve 8, and secured to the lower end of the cylinder is a corresponding disk 12.

The stem 10 is provided at its upper exposed end with an enlarged portion 13 having an opening therethrough to facilitate its attachment to a part of the vehicle to which it is to be applied.

In the use of the device its ends may be attached, for instance, one to the upper portion of an elliptical spring of a vehicle and the other to the lower part thereof; one end may be attached to an axle of a vehicle and the other to the spring-held body of the vehicle, or it may be arranged in any other position where its function to govern the movements of the body of the vehicle caused by compression or expansion of the supporting springs may be exercised.

From the foregoing the operation of the shock absorber will be readily understood. Assuming that the lower end of the device is attached to an axle of a vehicle and that the upper end is attached to the body thereof, and that the disks 11 and 12 are in their normal positions, as shown by dotted lines in the drawing, each removed a short distance from one end of the cylinder 9, should the wheels of the vehicle come into contact with an elevation in the road the body 1 of the device and the collar 8 would be moved upwardly. This upward movement would cause a rotation of the cylinder 9 in the collar 8 by reason of the interengaging screw threads of the parts, irrespective of the amount of force exerted, because of the high pitch of those threads. The frictional engagement of the threads, however, would exercise a deterrent action and tend to check the upward movement of the case 1 and of the collar.

If excessive force is imposed on the body 1, the upward movements of the body 1 and the collar 8 are continued until the upper face of the collar is brought to contact with the upper disk 11 which is attached to the cylinder 9, and the rotation of the cylinder independently of the collar 8 is checked. When the parts are in this postion, the continued upward movement of the body 1 will cause the rotation of the collar 8 within the body. As the interengaging teeth of the body and those of the exterior of the collar are of a pitch lower than those of the interior of the collar and the cylinder 9, the friction imposed on these parts is greater, and consequently the rotation of the collar is gradually checked and finally terminated. On the rebound or expansion of the spring, the lower disk 12 being removed from the lower end of the cylinder 9, only moderate resistance is offered to the rotation of cylinder as the body 1 and the collar 8 return to normal positions. As the movements of these parts approach their terminations, the disk 12 contacting with the collar 8 causes the collar and cylinder to rotate, and, by reason of the greater friction thus brought into play, the downward movements of the body and collar are checked and finally stopped, as in their upward movements.

Inasmuch as the beginning of a movement, either up or down, of the body 1 and the collar or ring 8 results in a rotation of the cylinder 9, it will be clear that because of the frictional contact of the parts more or less rotation of the collar or ring is caused. Therefore, as the inertia of the collar or ring is thus overcome, when one of the disks of the rotating cylinder contacts with the ring or collar, the rotation of the collar or ring is easily accomplished, though the pitch of the threads on the outer face of the ring or collar and those on the inner face of the body 1 are of low pitch. By reason of the high pitch of the screw threads on the interior of the collar 8 and on the exterior cylinder, when a vehicle receives an impulse tending to compress or expand its supporting springs, action to reduce or avoid shock to a vehicle body supported by the springs begins instantaneously, and this action is gradually continued by reason of the frictional contact of the threads of the parts of the shock absorber until the shocks or jars caused by the impulse are absorbed, and the movements of the parts cease. Thus, no time will the force of any sudden up or down movement of the wheels of a vehicle be communicated in the form of shocks or jars to a body carried on the springs of the vehicle.

The pitch of the screw threads of the parts of the deivce may be varied to any extent, according to the use intended. Generally, for use on light vehicles the pitch would be higher than those for use on heavier ones.

I claim:

1. A shock absorber comprising an interiorly screw threaded body member, a cylindrical member having external screw threads of a higher pitch than those on the body member, and an intermediate member receiving the cylindrical member and having on its outer face screw threads corresponding to those on the interior of the body member, and having on its inner face screw threads corresponding to those on the cylinder member.

2. A shock absorber comprising an interiorly screw threaded body member, a cylindrical member having external screw threads of a higher pitch than those on the body member, an intermediate member having on its outer face screw threads corresponding to those on the body member and having on its inner face screw threads corresponding to those on the cylinder member, and means for causing the cylindrical member and the intermediate member to rotate in unison.

3. A shock absorber comprising an interiorly screw threaded body member, a cylindrical member having external screw threads of a higher pitch than those on the body member and provided at its ends with disks of greater diameters than that of the cylindrical member, and an intermediate member receiving the cylindrical member and having exterior screw threads corresponding to those on the body member, and interior screw threads corresponding to those on the cylindrical member.

4. A shock absorber comprising an interiorly screw threaded body, a ring or collar located in the body and provided with exterior screw threads engaging those on the body, and with interior screw threads of a higher pitch than those on the body member, and a cylinder located in the ring and having on its face screw threads corresponding to the interior screw threads of the ring.

5. A shock absorber comprising an interiorly screw threaded body member, a ring or collar having exterior screw threads engaging those on the body member and interior screw threads of a high pitch, a cylinder having exterior screw threads corresponding to the interior screw threads of the collar or ring, the ends of the cylinder being provided with disks extending beyond its periphery and adapted to contact with the collar or ring.

6. A shock absorber comprising an interiorly screw threaded body member having means for securing it in place for use, a cylindrical member having external screw threads of a higher pitch than those on the body member, an intermediate member receiving the cylindrical member and having on its outer face screw threads corresponding to those on the body member, and having on its inner face screw threads corresponding to those on the cylindrical member, and a stem provided with means for securing it in place for use and attached to the cylindrical member.

In testimony whereof I affix my signature.

WILLIAM J. SMITH.